(12) United States Patent
Hsieh et al.

(10) Patent No.: US 11,757,484 B2
(45) Date of Patent: Sep. 12, 2023

(54) RADIO FREQUENCY FRONT-END CIRCUIT AND MOBILE TERMINAL

(71) Applicant: VIVO MOBILE COMMUNICATION CO., LTD., Guangdong (CN)

(72) Inventors: Cheng-Nan Hsieh, Guangdong (CN); Xuefeng Sheng, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 146 days.

(21) Appl. No.: 17/481,409

(22) Filed: Sep. 22, 2021

(65) Prior Publication Data

US 2022/0014229 A1  Jan. 13, 2022

Related U.S. Application Data

(63) Continuation of application No. PCT/CN2020/080003, filed on Mar. 18, 2020.

(30) Foreign Application Priority Data

Mar. 22, 2019 (CN) .......................... 201910222617.0

(51) Int. Cl.
  *H04B 1/44* (2006.01)
  *H04B 7/0404* (2017.01)

(52) U.S. Cl.
  CPC ............. *H04B 1/44* (2013.01); *H04B 7/0404* (2013.01)

(58) Field of Classification Search
  CPC ...... H04B 1/0078; H04B 1/44; H04B 7/0404; H04B 7/0602
  See application file for complete search history.

(56) References Cited

U.S. PATENT DOCUMENTS

| | | | |
|---|---|---|---|
| 5,280,637 | A | 1/1994 | Larosa et al. |
| 5,926,751 | A | 7/1999 | Vlahos et al. |
| 2005/0064897 | A1 | 3/2005 | Nohara et al. |
| 2006/0025171 | A1 | 2/2006 | Ly et al. |
| 2006/0063494 | A1 | 3/2006 | Zhang et al. |

(Continued)

FOREIGN PATENT DOCUMENTS

| | | |
|---|---|---|
| CN | 106160775 A | 11/2016 |
| CN | 106487415 A | 3/2017 |

(Continued)

*Primary Examiner* — Nguyen T Vo
(74) *Attorney, Agent, or Firm* — Price Heneveld LLP (57) ABSTRACT

This disclosure provides a radio frequency front-end circuit and a mobile terminal. The circuit includes: a gating switch, separately connected to a first antenna, a second antenna, and a radio frequency circuit module; and a double-pole double-throw switch, separately connected to the gating switch, a third antenna, a fourth antenna, and a first radio frequency circuit, where the radio frequency circuit module is connected to a first target antenna in the first and second antennas via the gating switch, and receives and/or transmits a signal with the first target antenna; or the radio frequency circuit module is connected to a second target antenna in the third and fourth antennas via the gating switch and the double-pole double-throw switch, and receives and/or transmits a signal with the second target antenna; the first radio frequency circuit is connected to one of the third and fourth antennas via the double-pole double-throw switch.

20 Claims, 4 Drawing Sheets

(56) References Cited

U.S. PATENT DOCUMENTS

| | | |
|---|---|---|
| 2010/0225414 A1 | 9/2010 | Gorbachov |
| 2012/0306716 A1 | 12/2012 | Satake et al. |
| 2014/0141732 A1 | 5/2014 | Medapalli et al. |
| 2015/0280752 A1 | 10/2015 | Harjani et al. |
| 2017/0126257 A1 | 5/2017 | Wang et al. |
| 2017/0179997 A1* | 6/2017 | Liao .................... H04B 1/44 |
| 2019/0288733 A1* | 9/2019 | Bai .................... H04B 1/005 |
| 2020/0067542 A1 | 2/2020 | Xu et al. |
| 2020/0127698 A1* | 4/2020 | Cho ................ H04L 25/0226 |

FOREIGN PATENT DOCUMENTS

| | | |
|---|---|---|
| CN | 106656248 A | 5/2017 |
| CN | 107094032 A | 8/2017 |
| CN | 107733450 A | 2/2018 |
| CN | 107733451 A | 2/2018 |
| CN | 108808265 A | 11/2018 |
| CN | 109873664 A | 6/2019 |
| JP | 2008516527 A | 5/2008 |
| RU | 2107395 C1 | 3/1998 |
| RU | 2214050 C2 | 10/2003 |
| RU | 65319 U1 | 7/2007 |
| RU | 2479919 C1 | 4/2013 |
| WO | 2011061946 A1 | 5/2011 |
| WO | 2017203918 A1 | 11/2017 |

\* cited by examiner

RADIO FREQUENCY FRONT-END CIRCUIT AND MOBILE TERMINAL

CROSS-REFERENCE TO RELATED APPLICATIONS

This application is a continuation application of PCT Application No. PCT/CN2020/080003 filed on Mar. 18, 2020, which claims priority to Chinese Patent Application No. 201910222617.0, filed in China on Mar. 22, 2019, disclosures of which are incorporated herein by reference in their entireties.

TECHNICAL FIELD

Embodiments of this disclosure relate to the technical field of terminal application, and in particular, to a radio frequency front-end circuit and a mobile terminal.

BACKGROUND

With the rapid development of Internet communication technology and the increasing popularization of smart mobile terminals, users are having growing demands for data traffic. From a transmission rate of 100 Mbit/s to 1 Gbit/s in the fourth generation wireless technology (4G) to a peak transmission rate of up to 20 Gbit/s in the fifth generation wireless technology (5G) new radio (NR), the increase in rates requires 5G to support the key technology of 4×4 multiple input multiple output (MIMO).

Figure 1:
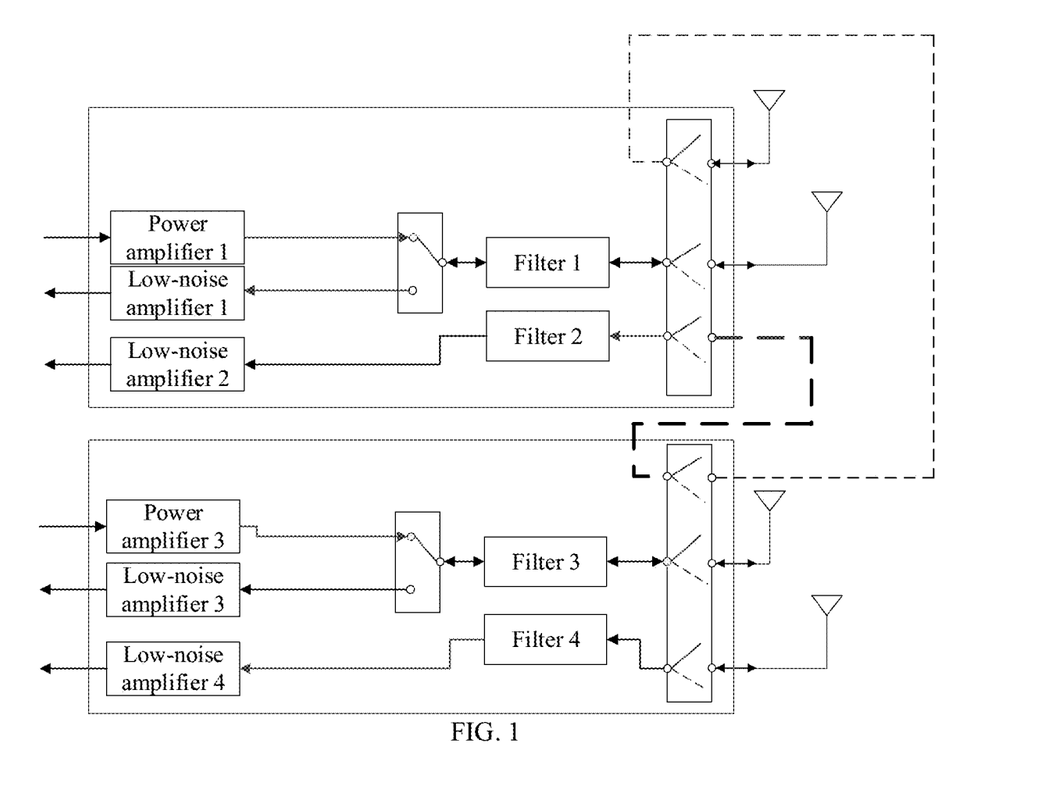
FIG. 1 is a schematic structural diagram of a radio frequency front-end circuit in the related art.

FIG. 1 is a schematic structural diagram of a radio frequency front-end circuit of a 5G mobile terminal device. This circuit structure is used to realize one-transmit four-receive 1T4R and two-transmit four-receive 2T4R schemes. The layout wiring of the 5G mobile terminal device directly affects path loss. As shown in FIG. 1, in the radio frequency front-end circuit structure of the 5G mobile terminal device in the related art, the long wiring leads to a high path loss. In addition, in the radio frequency front-end circuit structure of the 5G mobile terminal device in the related art, a three-pole three-throw switch is typically used. A higher signal transmission frequency leads to a higher bandwidth and a greater component loss, making output power hard to meet requirements. Therefore, how to reduce the path loss, component loss, and circuit design complexity requires an urgent solution.

SUMMARY

According to a first aspect, an embodiment of this disclosure provides a radio frequency front-end circuit, including:
  a gating switch, separately connected to a first antenna, a second antenna, and a radio frequency circuit module; and
  a double-pole double-throw switch, separately connected to the gating switch, a third antenna, a fourth antenna, and a first radio frequency circuit; where
  the radio frequency circuit module is connected to a first target antenna in the first antenna and the second antenna by using the gating switch, and receives and/or transmits a signal by using the first target antenna; or the radio frequency circuit module is connected to a second target antenna in the third antenna and the fourth antenna by using the gating switch and the double-pole double-throw switch, and receives and/or transmits a signal by using the second target antenna;
  in a case that the radio frequency circuit module is connected to the first target antenna in the first antenna and the second antenna, the first radio frequency circuit is connected to the second target antenna in the third antenna and the fourth antenna by using the double-pole double-throw switch, and receives and/or transmits a signal by using the second target antenna; and
  in a case that the radio frequency circuit module is connected to the second target antenna in the third antenna and the fourth antenna, the first radio frequency circuit is connected to a third target antenna in the third antenna and the fourth antenna, other than the second target antenna, by using the double-pole double-throw switch, and receives and/or transmits a signal by using the third target antenna.

According to a second aspect, an embodiment of this disclosure further provides a mobile terminal, including:
  a controller; and
  the radio frequency front-end circuit according to the foregoing embodiment, where
  the controller is configured to control opening/closing of a gating switch and/or a double-pole double-throw switch.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure shall fall within the protection scope of this disclosure.

Figure 2:
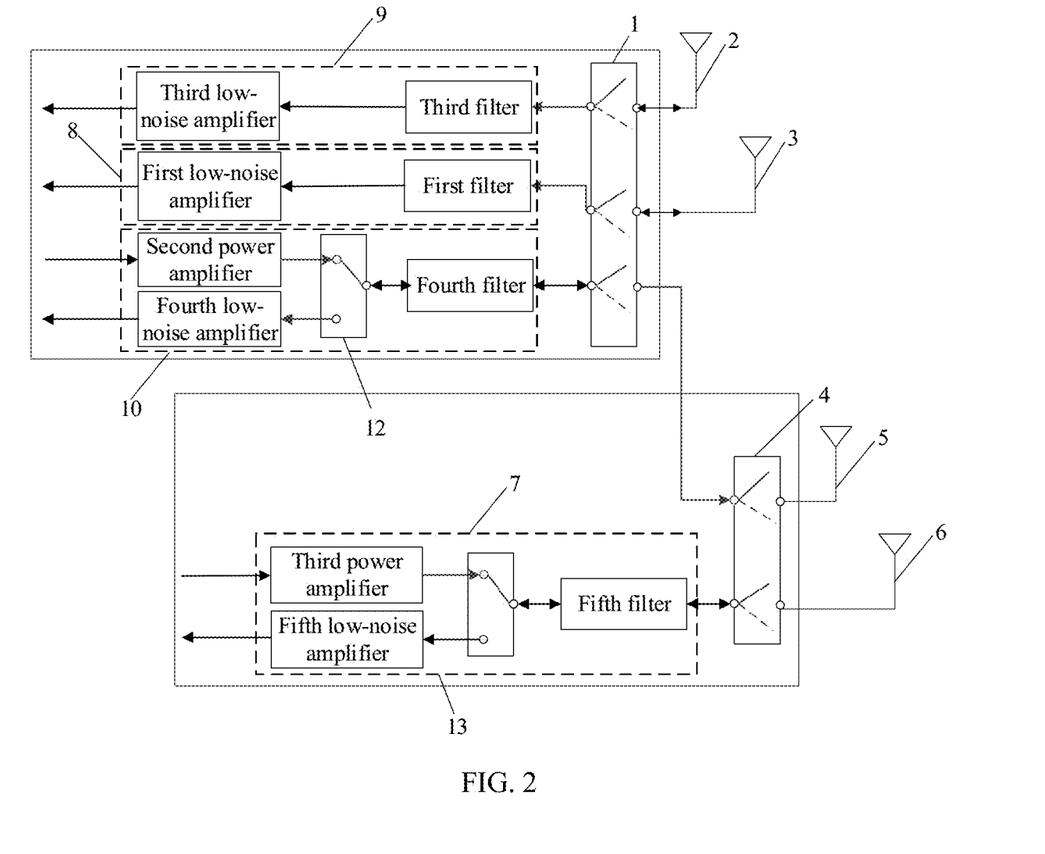
FIG. 2 is a first schematic structural diagram of a radio frequency front-end circuit according to an embodiment of this disclosure.

FIG. 2 is a first schematic structural diagram of a radio frequency front-end circuit according to an embodiment of this disclosure. The radio frequency front-end circuit includes: a gating switch 1, separately connected to a first antenna 2, a second antenna 3, and a radio frequency circuit module; and a double-pole double-throw switch 4, separately connected to the gating switch 1, a third antenna 5, a fourth antenna 6, and a first radio frequency circuit 7; where the radio frequency circuit module is connected to a first target antenna in the first antenna 2 and the second antenna 3 by using the gating switch 1, and receives and/or transmits a signal by using the first target antenna; or the radio frequency circuit module is connected to a second target antenna in the third antenna 5 and the fourth antenna 6 by using the gating switch 1 and the double-pole double-throw switch 4, and receives and/or transmits a signal by using the second target antenna.

In a case that the radio frequency circuit module is connected to the first target antenna in the first antenna 2 and the second antenna 3, the first radio frequency circuit 7 is connected to the second target antenna in the third antenna 5 and the fourth antenna 6 by using the double-pole double-throw switch 4, and receives and/or transmits a signal by using the second target antenna; and in a case that the radio frequency circuit module is connected to the second target antenna in the third antenna 5 and the fourth antenna 6, the first radio frequency circuit 7 is connected to a third target antenna in the third antenna 5 and the fourth antenna 6, other than the second target antenna, by using the double-pole double-throw switch 4, and receives and/or transmits a signal by using the third target antenna.

Herein, the first target antenna is the first antenna 2 or the second antenna 3, and the second target antenna is the third antenna 5 or the fourth antenna 6.

It should be noted that if the second target antenna is the third antenna 5, the third target antenna is the fourth antenna 6; or if the second target antenna is the fourth antenna 6, the third target antenna is the third antenna 5.

It should be noted that the radio frequency circuit module includes: a signal receive circuit and/or a signal transmit circuit.

Specifically, the signal receive circuit is configured to receive a signal by using a connected antenna, and the signal transmit circuit is configured to transmit a signal by using a connected antenna.

Herein, the double-pole double-throw switch connected to the gating switch is used, where the gating switch is also separately connected to the first antenna, the second antenna, and the radio frequency circuit module, and the double-pole double-throw switch is also separately connected to the third antenna, the fourth antenna, and the first radio frequency circuit. As such, the radio frequency circuit module connected to the gating switch can flexibly receive and/or transmit a signal by using any antenna. Such circuit has a simple design, and can shorten radio frequency layout wiring while implementing signal transmission and/or reception, thereby reducing path loss.

Figure 3:
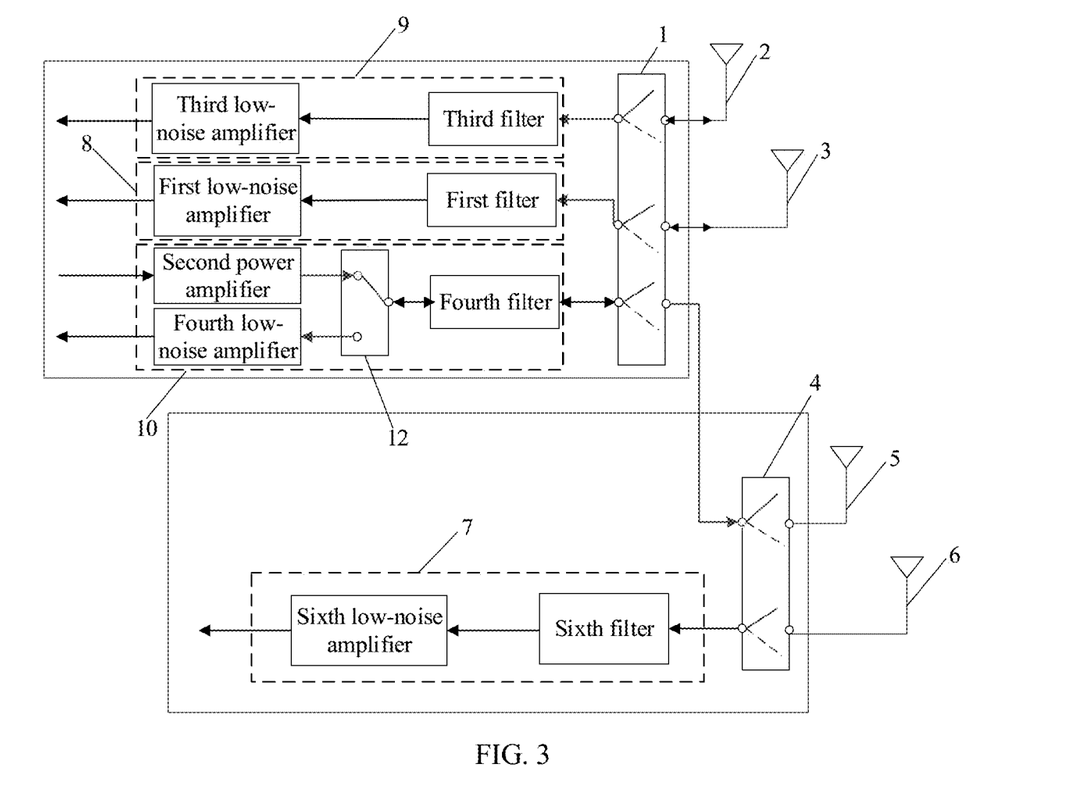
FIG. 3 is a second schematic structural diagram of a radio frequency front-end circuit according to an embodiment of this disclosure.
Figure 4:
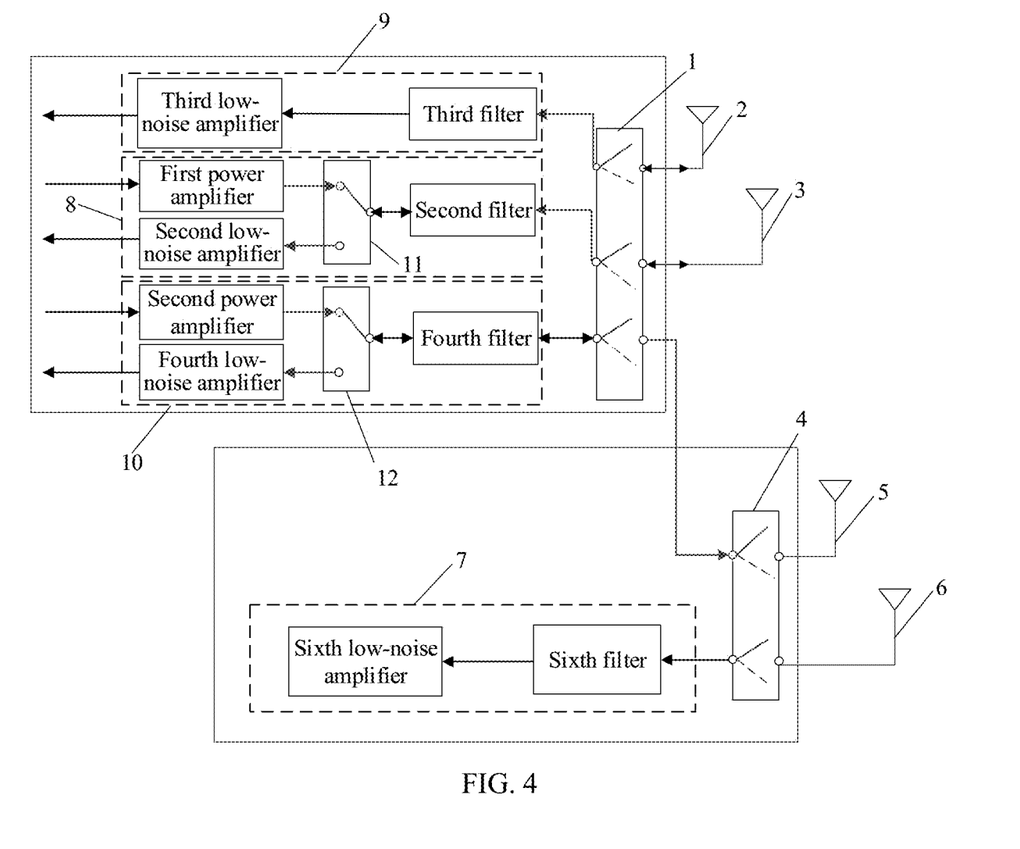
FIG. 4 is a third schematic structural diagram of a radio frequency front-end circuit according to an embodiment of this disclosure.

Optionally, as shown in FIG. 2 to FIG. 4, the radio frequency circuit module includes: a second radio frequency circuit 8, a third radio frequency circuit 9, and a fourth radio frequency circuit 10; and the gating switch 1 includes: a first movable terminal, a second movable terminal, a third movable terminal, a first fixed terminal, a second fixed terminal, and a third fixed terminal; where the first movable terminal is connected to the second radio frequency circuit 8; the second movable terminal is connected to the third radio frequency circuit 9; the third movable terminal is connected to the fourth radio frequency circuit 10; the first fixed terminal is connected to the first antenna 2; the second fixed terminal is connected to the second antenna 3; and the third fixed terminal is connected to a movable terminal of the double-pole double-throw switch 4.

Herein, the gating switch 1 is configured to connect the first movable terminal to one of the first fixed terminal, the second fixed terminal, and the third fixed terminal; further configured to connect the second movable terminal to one of the first fixed terminal, the second fixed terminal, and the third fixed terminal; and further configured to connect the third movable terminal to one of the first fixed terminal, the second fixed terminal, and the third fixed terminal.

Optionally, as shown in FIG. 2 to FIG. 4, the double-pole double-throw switch 4 includes: a fourth movable terminal, a fifth movable terminal, a fourth fixed terminal, and a fifth fixed terminal, where the fourth movable terminal is connected to the gating switch 1; the fifth movable terminal is connected to the first radio frequency circuit 7; the fourth fixed terminal is connected to the third antenna 5; and the fifth fixed terminal is connected to the fourth antenna 6.

In an optional embodiment, as shown in FIG. 2, the second radio frequency circuit 8 includes: a first low-noise amplifier; and a first filter separately connected to the first low-noise amplifier and the first movable terminal of the gating switch 1, where when the first movable terminal of the gating switch 1 is connected to one of its first fixed terminal and second fixed terminal, the second radio frequency circuit 8 receives a signal by using the first target antenna.

It should be noted that because the first fixed terminal is connected to the first antenna 2 and the second fixed terminal is connected to the second antenna 3, the first target antenna connected to the second radio frequency circuit 8 is the first antenna 2 or the second antenna 3.

Alternatively, when the first movable terminal of the gating switch 1 is connected to its third fixed terminal, and the movable terminal of the double-pole double-throw switch 4 connected to the third fixed terminal is connected to one of the two fixed terminals of the double-pole double-throw switch 4, the second radio frequency circuit 8 receives a signal by using the second target antenna.

It should be noted that, as shown in FIG. 2, the movable terminal of the double-pole double-throw switch 4 connected to the third fixed terminal specifically refers to the fourth movable terminal of the double-pole double-throw switch 4. Because the two fixed terminals of the double-pole double-throw switch 4 are connected to the third antenna 5 and the fourth antenna 6 respectively, the second target antenna connected to the second radio frequency circuit 8 is the third antenna 5 or the fourth antenna 6.

In this embodiment, the second radio frequency circuit 8 is a signal receive circuit in which a signal is received by using a connected antenna. It should be noted that, by using the gating switch 1 and the double-pole double-throw switch 4 connected to the gating switch 1, the second radio frequency circuit 8 can flexibly receive a signal by using any antenna in the radio frequency front-end circuit, thereby shortening the radio frequency layout wiring and reducing the path loss.

In addition, when the second radio frequency circuit 8 is connected to the third antenna 5 or the fourth antenna 6 by using the double-pole double-throw switch 4, reception performance of the second radio frequency circuit 8 can also be improved due to the small component loss and good isolation of the double-pole double-throw switch.

In another optional embodiment, as shown in FIG. 3, the second radio frequency circuit 8 includes: a second low-noise amplifier, a first power amplifier, a first transfer switch 11, and a second filter separately connected to the first movable terminal of the gating switch 1 and the first transfer switch 11.

Specifically, when the second low-noise amplifier is connected to the second filter by using the first transfer switch 11, and the first movable terminal of the gating switch 1 is connected to one of its first fixed terminal and second fixed terminal, the second radio frequency circuit 8 receives a signal by using the connected first target antenna.

Herein, because the first fixed terminal is connected to the first antenna 2 and the second fixed terminal is connected to the second antenna 3, the first target antenna connected to the second radio frequency circuit 8 is the first antenna 2 or the second antenna 3.

Alternatively, when the second low-noise amplifier is connected to the second filter by using the first transfer switch 11, the first movable terminal of the gating switch 1 is connected to its third fixed terminal, and the movable terminal of the double-pole double-throw switch 4 connected to the third fixed terminal is connected to one of the two fixed terminals of the double-pole double-throw switch 4, the second radio frequency circuit 8 receives a signal by using the connected second target antenna.

Herein, it should be noted that, as shown in FIG. 3, the movable terminal of the double-pole double-throw switch 4 connected to the third fixed terminal specifically refers to the fourth movable terminal of the double-pole double-throw switch 4. Because the two fixed terminals of the double-pole double-throw switch 4 are connected to the third antenna 5 and the fourth antenna 6 respectively, the second target antenna connected to the second radio frequency circuit 8 is the third antenna 5 or the fourth antenna 6.

Specifically, when the first power amplifier is connected to the second filter by using the first transfer switch 11, and the first movable terminal of the gating switch 1 is connected to one of its first fixed terminal and second fixed terminal, the second radio frequency circuit 8 transmits a signal by using the connected first target antenna.

Herein, because the first fixed terminal is connected to the first antenna 2 and the second fixed terminal is connected to the second antenna 3, the first target antenna connected to the second radio frequency circuit 8 is the first antenna 2 or the second antenna 3.

Alternatively, when the first power amplifier is connected to the second filter by using the first transfer switch 11, the first movable terminal of the gating switch 1 is connected to its third fixed terminal, and the movable terminal of the double-pole double-throw switch 4 connected to the third fixed terminal is connected to one of the two fixed terminals of the double-pole double-throw switch 4, the second radio frequency circuit 8 transmits a signal by using the connected second target antenna.

Herein, it should be noted that, as shown in FIG. 3, the movable terminal of the double-pole double-throw switch 4 connected to the third fixed terminal specifically refers to the fourth movable terminal of the double-pole double-throw switch 4. Because the two fixed terminals of the double-pole double-throw switch 4 are connected to the third antenna 5 and the fourth antenna 6 respectively, the second target antenna connected to the second radio frequency circuit 8 is the third antenna 5 or the fourth antenna 6.

In this embodiment, the second radio frequency circuit 8 includes a signal receive circuit and a signal transmit circuit.

Specifically, when the second low-noise amplifier is connected to the second filter by using the first transfer switch 11, the second low-noise amplifier and the second filter form the signal receive circuit, to receive a signal by using a connected antenna.

When the first power amplifier is connected to the second filter by using the first transfer switch 11, the first power amplifier and the second filter form the signal transmit circuit, to transmit a signal by using a connected antenna.

Herein, by using the gating switch 1 and the double-pole double-throw switch 4 connected to the gating switch 1, the second radio frequency circuit 8 can flexibly receive and/or transmit a signal by using any antenna in the radio frequency front-end circuit, thereby shortening the radio frequency layout wiring and reducing the path loss.

In addition, when the signal receive circuit in the second radio frequency circuit 8 is connected to the third antenna 5 or the fourth antenna 6 by using the double-pole double-throw switch 4, reception performance of the second radio frequency circuit 8 can also be improved due to the small component loss and good isolation of the double-pole double-throw switch.

When the signal transmit circuit in the second radio frequency circuit 8 is connected to the third antenna 5 or the fourth antenna 6 by using the double-pole double-throw switch 4, transmission performance of the second radio frequency circuit 8 can also be improved due to the small component loss and good isolation of the double-pole double-throw switch.

Herein, optionally, the first transfer switch 11 is a single-pole double-throw switch, including one movable terminal and two fixed terminals. The movable terminal is connected to the second filter, one of the fixed terminals is connected to an input terminal of the second low-noise amplifier, and the other fixed terminal is connected to an output terminal of the first power amplifier.

In an optional embodiment, as shown in FIG. 2 to FIG. 4, the third radio frequency circuit 9 includes: a third low-noise amplifier; and a third filter separately connected to the third low-noise amplifier and the second movable terminal of the gating switch 1.

When the second movable terminal of the gating switch 1 is connected to one of its first fixed terminal and second fixed terminal, the third radio frequency circuit 9 receives a signal by using the connected first target antenna.

It should be noted that because the first fixed terminal is connected to the first antenna 2 and the second fixed terminal is connected to the second antenna 3, the first target antenna connected to the third radio frequency circuit 9 is the first antenna 2 or the second antenna 3.

Alternatively, when the second movable terminal is connected to the third fixed terminal, and the movable terminal of the double-pole double-throw switch connected to the third fixed terminal is connected to one of the two fixed terminals of the double-pole double-throw switch, the third radio frequency circuit 9 receives a signal by using the connected second target antenna.

It should be noted that, as shown in FIG. 2 to FIG. 4, the movable terminal of the double-pole double-throw switch 4 connected to the third fixed terminal specifically refers to the fourth movable terminal of the double-pole double-throw switch 4. Because the two fixed terminals of the double-pole double-throw switch 4 are connected to the third antenna 5 and the fourth antenna 6 respectively, the second target antenna connected to the third radio frequency circuit 9 is the third antenna 5 or the fourth antenna 6.

In this embodiment, the third radio frequency circuit 9 is a signal receive circuit in which a signal is received by using a connected antenna. It should be noted that, by using the gating switch 1 and the double-pole double-throw switch 4 connected to the gating switch 1, the third radio frequency circuit 9 can flexibly receive a signal by using any antenna in the radio frequency front-end circuit, thereby shortening the radio frequency layout wiring and reducing the path loss.

In addition, when the third radio frequency circuit 9 is connected to the third antenna 5 or the fourth antenna 6 by using the double-pole double-throw switch 4, reception performance of the third radio frequency circuit 9 can also be improved due to the small component loss and good isolation of the double-pole double-throw switch.

In an optional embodiment, as shown in FIG. 2 to FIG. 4, the fourth radio frequency circuit 10 includes: a fourth low-noise amplifier, a second power amplifier, a second transfer switch 12, and a fourth filter separately connected to the third movable terminal of the gating switch 1 and the second transfer switch 12.

Specifically, when the fourth low-noise amplifier is connected to the fourth filter by using the second transfer switch 12, and the third movable terminal of the gating switch 1 is connected to one of its first fixed terminal and second fixed terminal, the fourth radio frequency circuit 10 receives a signal by using the connected first target antenna.

Herein, because the first fixed terminal is connected to the first antenna 2 and the second fixed terminal is connected to the second antenna 3, the first target antenna connected to the fourth radio frequency circuit 10 is the first antenna 2 or the second antenna 3.

Alternatively, when the fourth low-noise amplifier is connected to the fourth filter by using the second transfer switch 12, the third movable terminal of the gating switch 1 is connected to its third fixed terminal, and the movable terminal of the double-pole double-throw switch 4 connected to the third fixed terminal is connected to one of the two fixed terminals of the double-pole double-throw switch 4, the fourth radio frequency circuit 10 receives a signal by using the connected second target antenna.

Herein, it should be noted that, as shown in FIG. 2 to FIG. 4, the movable terminal of the double-pole double-throw switch 4 connected to the third fixed terminal specifically refers to the fourth movable terminal of the double-pole double-throw switch 4. Because the two fixed terminals of the double-pole double-throw switch 4 are connected to the third antenna 5 and the fourth antenna 6 respectively, the second target antenna connected to the fourth radio frequency circuit 10 is the third antenna 5 or the fourth antenna 6.

Specifically, when the second power amplifier is connected to the fourth filter by using the second transfer switch 12, and the third movable terminal of the gating switch 1 is connected to one of its first fixed terminal and second fixed terminal, the fourth radio frequency circuit 10 transmits a signal by using the connected first target antenna.

Herein, because the first fixed terminal is connected to the first antenna 2 and the second fixed terminal is connected to the second antenna 3, the first target antenna connected to the fourth radio frequency circuit 10 is the first antenna 2 or the second antenna 3.

Alternatively, when the second power amplifier is connected to the fourth filter by using the second transfer switch 12, the third movable terminal of the gating switch 1 is connected to its third fixed terminal, and the movable terminal of the double-pole double-throw switch 4 connected to the third fixed terminal is connected to one of the two fixed terminals of the double-pole double-throw switch 4, the fourth radio frequency circuit 10 transmits a signal by using the connected second target antenna.

Herein, it should be noted that, as shown in FIG. 2 to FIG. 4, the movable terminal of the double-pole double-throw switch 4 connected to the third fixed terminal specifically refers to the fourth movable terminal of the double-pole double-throw switch 4. Because the two fixed terminals of the double-pole double-throw switch 4 are connected to the third antenna 5 and the fourth antenna 6 respectively, the second target antenna connected to the fourth radio frequency circuit 10 is the third antenna 5 or the fourth antenna 6.

In this embodiment, the fourth radio frequency circuit 10 includes a signal receive circuit and a signal transmit circuit.

Specifically, when the fourth low-noise amplifier is connected to the fourth filter by using the second transfer switch 12, the fourth low-noise amplifier and the fourth filter form the signal receive circuit, to receive a signal by using a connected antenna.

When the second power amplifier is connected to the fourth filter by using the second transfer switch 12, the second power amplifier and the fourth filter form the signal transmit circuit, to transmit a signal by using a connected antenna.

Herein, by using the gating switch 1 and the double-pole double-throw switch 4 connected to the gating switch 1, the fourth radio frequency circuit 10 can flexibly receive and/or transmit a signal by using any antenna in the radio frequency front-end circuit, thereby shortening the radio frequency layout wiring and reducing the path loss.

In addition, when the signal receive circuit in the fourth radio frequency circuit 10 is connected to the third antenna 5 or the fourth antenna 6 by using the double-pole double-throw switch 4, reception performance of the fourth radio frequency circuit 10 can also be improved due to the small component loss and good isolation of the double-pole double-throw switch.

When the signal transmit circuit in the fourth radio frequency circuit 10 is connected to the third antenna 5 or the fourth antenna 6 by using the double-pole double-throw switch 4, transmission performance of the fourth radio frequency circuit 10 can also be improved due to the small component loss and good isolation of the double-pole double-throw switch.

Herein, optionally, the second transfer switch 12 is a single-pole double-throw switch, including one movable terminal and two fixed terminals. The movable terminal is connected to the fourth filter, one of the fixed terminals is connected to an input terminal of the fourth low-noise amplifier, and the other fixed terminal is connected to an output terminal of the second power amplifier.

In an optional embodiment, as shown in FIG. 2, the first radio frequency circuit 7 includes: a fifth low-noise amplifier, a third power amplifier, a third transfer switch 13, and a fifth filter separately connected to the fifth movable terminal of the double-pole double-throw switch 4 and the third transfer switch 13.

Specifically, when the fifth low-noise amplifier is connected to the fifth filter by using the third transfer switch 13, and the fifth movable terminal of the double-pole double-throw switch 4 is connected to one of its fourth fixed terminal and fifth fixed terminal, the first radio frequency circuit 7 receives a signal by using the connected second target antenna.

Alternatively, when the third power amplifier is connected to the fifth filter by using the third transfer switch 13, and the fifth movable terminal of the double-pole double-throw switch 4 is connected to one of its fourth fixed terminal and fifth fixed terminal, the first radio frequency circuit 7 transmits a signal by using the connected second target antenna.

Herein, because the fourth fixed terminal is connected to the third antenna 5 and the fifth fixed terminal is connected to the fourth antenna 6, the second target antenna connected to the first radio frequency circuit 7 is the third antenna 5 or the fourth antenna 6.

In this embodiment, the first radio frequency circuit 7 includes a signal receive circuit and a signal transmit circuit.

Specifically, when the fifth low-noise amplifier is connected to the fifth filter by using the third transfer switch 13, the fifth low-noise amplifier and the fifth filter form the signal receive circuit, to receive a signal by using a connected antenna.

When the third power amplifier is connected to the fifth filter by using the third transfer switch 13, the third power amplifier and the fifth filter form the signal transmit circuit, to transmit a signal by using a connected antenna.

Herein, when the first radio frequency circuit 7 is connected to the third antenna 5 or the fourth antenna 6 by using the double-pole double-throw switch 4, transmission performance and/or reception performance of the first radio frequency circuit 7 can be improved due to the small component loss and good isolation of the double-pole double-throw switch.

In another optional embodiment, as shown in FIG. 3 and FIG. 4, the first radio frequency circuit 7 includes: a sixth low-noise amplifier; and a sixth filter separately connected to the sixth low-noise amplifier and the fifth movable terminal of the double-pole double-throw switch 4.

When the fifth movable terminal of the double-pole double-throw switch 4 is connected to one of its fourth fixed terminal and fifth fixed terminal, the first radio frequency circuit 7 receives a signal by using the connected second target antenna.

It should be noted that because the fourth fixed terminal is connected to the third antenna 5 and the fifth fixed terminal is connected to the fourth antenna 6, the second target antenna connected to the first radio frequency circuit 7 is the third antenna 5 or the fourth antenna 6.

Herein, optionally, the third transfer switch 13 is a single-pole double-throw switch, including one movable terminal and two fixed terminals. The movable terminal is connected to the fifth filter, one of the fixed terminals is connected to an input terminal of the fifth low-noise amplifier, and the other fixed terminal is connected to an output terminal of the third power amplifier.

In this embodiment, the first radio frequency circuit 7 is a signal receive circuit, in which a signal is received by using a connected antenna. It should be noted that, when the fifth radio frequency circuit is connected to the third antenna 5 or the fourth antenna 6 by using the double-pole double-throw switch 4, reception performance of the first radio frequency circuit 7 can be improved due to the small component loss and good isolation of the double-pole double-throw switch.

In an example, if the second radio frequency circuit 8 is connected to the first antenna 2 by using the gating switch 1, the third radio frequency circuit 9 can be connected to the second antenna 3 by using the gating switch 1, or the third radio frequency circuit 9 can be connected to the third antenna 5 by using the gating switch 1 and the double-pole double-throw switch 4; and if the third radio frequency circuit 9 is connected to the second antenna 3 by using the gating switch 1, the fourth radio frequency circuit 10 is connected to the third antenna 5 or the fourth antenna 6 by using the double-pole double-throw switch 4; or if the fourth radio frequency circuit 10 is connected to the third antenna 5 by using the double-pole double-throw switch 4, the first radio frequency circuit 7 is connected to the fourth antenna 6 by using the double-pole double-throw switch 4.

Further, the radio frequency front-end circuit in this embodiment of this disclosure further includes: a radio frequency transceiver (not shown in the figure), and the radio frequency transceiver is separately connected to the radio frequency circuit module and the first radio frequency circuit 7.

It should be noted that the radio frequency front-end circuit shown in FIG. 2 and the radio frequency front-end circuit shown in FIG. 4 can implement 1T4R/2T4R functions of a 5G NR system, to ensure 1-channel transmission and 4-channel reception, or 2-channel transmission and 4-channel reception.

The radio frequency front-end circuit shown in FIG. 3 can implement the 1T4R function of the 5G NR system, to ensure 1-channel transmission and 4-channel reception.

The following briefly describes a signal transmission/reception process in the radio frequency front-end circuit of this disclosure with reference to FIG. 2.

For a transmit path:
1. For example, after being transmitted by the radio frequency transceiver (not shown in the figure), a first transmit signal can be amplified by the second power amplifier, transferred through the second transfer switch 12, filtered by the fourth filter, transferred through the gating switch 1, and then:
    (1) transmitted by the first antenna 2 or the second antenna 3; or
    (2) transferred through the double-pole double-throw switch 4 and transmitted by the third antenna 5 and the fourth antenna 6.
2. For example, after being transmitted by the radio frequency transceiver (not shown in the figure), a second transmit signal can be amplified by the third power amplifier, transferred through the third transfer switch 13, filtered by the fifth filter, transferred through the double-pole double-throw switch 4, and then:
    (1) transmitted by the third antenna 5 or the fourth antenna 6.

It should be noted that if the first transmit signal is transmitted by one of the third antenna 5 and the fourth antenna 6, the second transmit signal is transmitted by the other antenna of the third antenna 5 and the fourth antenna 6 that is not used to transmit the first transmit signal.

For a receive path:
Since the 5G NR system needs to support 4-channel simultaneous reception, the first receive signal can be received through the first antenna 2, transferred through the gating switch 1, filtered by the fourth filter, transferred through the second transfer switch 12 to a path of the fourth low-noise amplifier for amplification, and then transmitted to the radio frequency transceiver for subsequent processing.

The second receive signal can be received through the second antenna 3, transferred through the gating switch 1, filtered by the first filter, transferred to a path of the first low-noise amplifier for amplification, and then transmitted to the radio frequency transceiver for subsequent processing.

It should be understood that the signal transmit path of the first receive signal and the signal transmit path of the second receive signal are only examples. In other words, after being received through the first antenna 2 or the second antenna 3, the receive signal can be transferred through the gating switch 1 to the receive path including the first low-noise amplifier, or the receive path including the third low-noise amplifier, or the receive path including the fourth low-noise amplifier according to the actual situation, which is not specifically limited herein.

Similarly, the third receive signal is received through the third antenna 5, transferred through the double-pole double-throw switch 4 and then the gating switch 1, filtered by the third filter, transferred to a path of the third low-noise amplifier for amplification, and then transmitted to the radio frequency transceiver for subsequent processing.

The fourth receive signal is received through the third antenna 5 or the fourth antenna 6, transferred through the double-pole double-throw switch 4 to a path of the fifth filter for filtering, amplified by the fifth low-noise amplifier, and then transmitted to the radio frequency transceiver for subsequent processing.

It should be understood that the signal transmit path of the third receive signal and the signal transmit path of the fourth receive signal are only examples. In other words, after being received through the third antenna 5 or the fourth antenna 6, the receive signal can be transferred through the double-pole double-throw switch 4 to the receive path including the fifth low-noise amplifier, or can be transferred through the double-pole double-throw switch 4 and the gating switch 1 to the receive path including the first low-noise amplifier, or the receive path including the third low-noise amplifier, or the receive path including the fourth low-noise amplifier according to the actual situation, which is not specifically limited herein.

In the radio frequency front-end circuit according to the embodiments of this disclosure, the double-pole double-throw switch connected to the gating switch is used, where the gating switch is also separately connected to the first antenna, the second antenna, and three radio frequency circuits, which are the second radio frequency circuit, third radio frequency circuit, and fourth radio frequency circuit, and the double-pole double-throw switch is also separately connected to the third antenna, the fourth antenna, and one radio frequency circuit which is the first radio frequency circuit. As such, the three radio frequency circuits connected to the gating switch can flexibly receive and/or transmit a signal by using any antenna, and the one radio frequency circuit connected to the double-pole double-throw switch can flexibly receive and/or transmit a signal by using the third antenna or the fourth antenna. Such circuit has a simple design, and can shorten radio frequency layout wiring while implementing signal transmission and/or reception, thereby reducing path loss.

In addition, it should be noted that, to shorten circuit design time of manufacturers and reduce costs, the radio frequency front-end circuit of this disclosure can be integrated into an integrated circuit chip.

An embodiment of this disclosure further provides a mobile terminal, including: a controller; and the radio frequency front-end circuit described in the foregoing embodiment. The controller is configured to control opening/closing of a gating switch and/or a double-pole double-throw switch.

The controller is further configured to control opening/closing of a first transfer switch, a second transfer switch, and/or a third transfer switch.

The embodiments of this disclosure are described above with reference to the accompanying drawings, but this disclosure is not limited to the foregoing implementations. The foregoing embodiments are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A radio frequency front-end circuit, comprising:
a gating switch, separately connected to a first antenna, a second antenna, and a radio frequency circuit module; and
a double-pole double-throw switch, separately connected to the gating switch, a third antenna, a fourth antenna, and a first radio frequency circuit; wherein
the gating switch is a three-pole three-throw switch;
the radio frequency circuit module is connected to a first target antenna in the first antenna and the second antenna by using the gating switch, and receives and/or transmits a signal by using the first target antenna; or
the radio frequency circuit module is connected to a second target antenna in the third antenna and the fourth antenna by using the gating switch and the double-pole double-throw switch, and receives and/or transmits a signal by using the second target antenna;
in a case that the radio frequency circuit module is connected to the first target antenna in the first antenna and the second antenna, the first radio frequency circuit is connected to the second target antenna in the third antenna and the fourth antenna by using the double-pole double-throw switch, and receives and/or transmits a signal by using the second target antenna; and
in a case that the radio frequency circuit module is connected to the second target antenna in the third antenna and the fourth antenna, the first radio frequency circuit is connected to a third target antenna in the third antenna and the fourth antenna, other than the second target antenna, by using the double-pole double-throw switch, and receives and/or transmits a signal by using the third target antenna.

2. The radio frequency front-end circuit according to claim 1, wherein the radio frequency circuit module comprises: a second radio frequency circuit, a third radio frequency circuit, and a fourth radio frequency circuit; and the gating switch comprises: a first movable terminal, a second movable terminal, a third movable terminal, a first fixed terminal, a second fixed terminal, and a third fixed terminal, wherein
the first movable terminal is connected to the second radio frequency circuit; the second movable terminal is connected to the third radio frequency circuit; the third movable terminal is connected to the fourth radio frequency circuit;
the first fixed terminal is connected to the first antenna; the second fixed terminal is connected to the second antenna; and the third fixed terminal is connected to a movable terminal of the double-pole double-throw switch.

3. The radio frequency front-end circuit according to claim 2, wherein the second radio frequency circuit comprises:
a first low-noise amplifier; and
a first filter, separately connected to the first low-noise amplifier and the first movable terminal, wherein
when the first movable terminal is connected to one of the first fixed terminal and the second fixed terminal, the second radio frequency circuit receives a signal by using the connected first target antenna; or
when the first movable terminal is connected to the third fixed terminal, and the movable terminal of the double-pole double-throw switch connected to the third fixed terminal is connected to one of the two fixed terminals of the double-pole double-throw switch, the second radio frequency circuit receives a signal by using the connected second target antenna.

4. The radio frequency front-end circuit according to claim 2, wherein the second radio frequency circuit comprises: a second low-noise amplifier, a first power amplifier, a first transfer switch, and a second filter separately connected to the first movable terminal and the first transfer switch.

5. The radio frequency front-end circuit according to claim 4, wherein when the second low-noise amplifier is connected to the second filter by using the first transfer switch, and the first movable terminal is connected to one of the first fixed terminal and the second fixed terminal, the second radio frequency circuit receives a signal by using the connected first target antenna; or
when the second low-noise amplifier is connected to the second filter by using the first transfer switch, the first movable terminal is connected to the third fixed terminal, and the movable terminal of the double-pole double-throw switch connected to the third fixed terminal is connected to one of the two fixed terminals of the double-pole double-throw switch, the second radio frequency circuit receives a signal by using the connected second target antenna.

6. The radio frequency front-end circuit according to claim 4, wherein when the first power amplifier is connected to the second filter by using the first transfer switch, and the first movable terminal is connected to one of the first fixed terminal and the second fixed terminal, the second radio frequency circuit transmits a signal by using the connected first target antenna; or when the first power amplifier is connected to the second filter by using the first transfer switch, the first movable terminal is connected to the third fixed terminal, and the movable terminal of the double-pole double-throw switch connected to the third fixed terminal is connected to one of the two fixed terminals of the double-pole double-throw switch, the second radio frequency circuit transmits a signal by using the connected second target antenna.

7. The radio frequency front-end circuit according to claim 2, wherein the third radio frequency circuit comprises:
a third low-noise amplifier; and
a third filter, separately connected to the third low-noise amplifier and the second movable terminal, wherein
when the second movable terminal is connected to one of the first fixed terminal and the second fixed terminal, the third radio frequency circuit receives a signal by using the connected first target antenna; or
when the second movable terminal is connected to the third fixed terminal, and the movable terminal of the double-pole double-throw switch connected to the third fixed terminal is connected to one of the two fixed terminals of the double-pole double-throw switch, the third radio frequency circuit receives a signal by using the connected second target antenna.

8. The radio frequency front-end circuit according to claim 2, wherein the fourth radio frequency circuit comprises: a fourth low-noise amplifier, a second power amplifier, a second transfer switch, and a fourth filter separately connected to the third movable terminal and the second transfer switch.

9. The radio frequency front-end circuit according to claim 8, wherein when the fourth low-noise amplifier is connected to the fourth filter by using the second transfer switch, and the third movable terminal is connected to one of the first fixed terminal and the second fixed terminal, the fourth radio frequency circuit receives a signal by using the connected first target antenna; or when the fourth low-noise amplifier is connected to the fourth filter by using the second transfer switch, the third movable terminal is connected to the third fixed terminal, and the movable terminal of the double-pole double-throw switch connected to the third fixed terminal is connected to one of the two fixed terminals of the double-pole double-throw switch, the fourth radio frequency circuit receives a signal by using the connected second target antenna.

10. The radio frequency front-end circuit according to claim 8, wherein when the second power amplifier is connected to the fourth filter by using the second transfer switch, and the third movable terminal is connected to one of the first fixed terminal and the second fixed terminal, the fourth radio frequency circuit transmits a signal by using the connected first target antenna; or when the second power amplifier is connected to the fourth filter by using the second transfer switch, the third movable terminal is connected to the third fixed terminal, and the movable terminal of the double-pole double-throw switch connected to the third fixed terminal is connected to one of the two fixed terminals of the double-pole double-throw switch, the fourth radio frequency circuit transmits a signal by using the connected second target antenna.

11. The radio frequency front-end circuit according to claim 1, wherein the double-pole double-throw switch comprises: a fourth movable terminal, a fifth movable terminal, a fourth fixed terminal, and a fifth fixed terminal, wherein
the fourth movable terminal is connected to the gating switch; the fifth movable terminal is connected to the first radio frequency circuit;
the fourth fixed terminal is connected to the third antenna; and the fifth fixed terminal is connected to the fourth antenna.

12. The radio frequency front-end circuit according to claim 11, wherein the first radio frequency circuit comprises: a fifth low-noise amplifier, a third power amplifier, a third transfer switch, and a fifth filter separately connected to the fifth movable terminal and the third transfer switch.

13. The radio frequency front-end circuit according to claim 12, wherein when the fifth low-noise amplifier is connected to the fifth filter by using the third transfer switch, and the fifth movable terminal is connected to one of the fourth fixed terminal and the fifth fixed terminal, the first radio frequency circuit receives a signal by using the connected second target antenna; or when the third power amplifier is connected to the fifth filter by using the third transfer switch, and the fifth movable terminal is connected to one of the fourth fixed terminal and the fifth fixed terminal, the first radio frequency circuit transmits a signal by using the connected second target antenna.

14. The radio frequency front-end circuit according to claim 11, wherein the first radio frequency circuit comprises:
a sixth low-noise amplifier; and
a sixth filter, separately connected to the sixth low-noise amplifier and the fifth movable terminal, wherein
when the fifth movable terminal is connected to one of the fourth fixed terminal and the fifth fixed terminal, the first radio frequency circuit receives a signal by using the connected second target antenna.

15. The radio frequency front-end circuit according to claim 1, further comprising:
a radio frequency transceiver, wherein the radio frequency transceiver is separately connected to the radio frequency circuit module and the first radio frequency circuit.

16. A mobile terminal, comprising:
a controller; and
a radio frequency front-end circuit, wherein the radio frequency front-end circuit comprises:
a gating switch, separately connected to a first antenna, a second antenna, and a radio frequency circuit module; and
a double-pole double-throw switch, separately connected to the gating switch, a third antenna, a fourth antenna, and a first radio frequency circuit; wherein
the gating switch is a three-pole three-throw switch;
the radio frequency circuit module is connected to a first target antenna in the first antenna and the second antenna by using the gating switch, and receives and/or transmits a signal by using the first target antenna; or the radio frequency circuit module is connected to a second target antenna in the third antenna and the fourth antenna by using the gating switch and the double-pole double-throw switch, and receives and/or transmits a signal by using the second target antenna;

in a case that the radio frequency circuit module is connected to the first target antenna in the first antenna and the second antenna, the first radio frequency circuit is connected to the second target antenna in the third antenna and the fourth antenna by using the double-pole double-throw switch, and receives and/or transmits a signal by using the second target antenna; and in a case that the radio frequency circuit module is connected to the second target antenna in the third antenna and the fourth antenna, the first radio frequency circuit is connected to a third target antenna in the third antenna and the fourth antenna, other than the second target antenna, by using the double-pole double-throw switch, and receives and/or transmits a signal by using the third target antenna;

wherein the controller is configured to control opening/closing of the gating switch and/or the double-pole double-throw switch.

17. The mobile terminal according to claim 16, wherein the radio frequency circuit module comprises: a second radio frequency circuit, a third radio frequency circuit, and a fourth radio frequency circuit; and the gating switch comprises: a first movable terminal, a second movable terminal, a third movable terminal, a first fixed terminal, a second fixed terminal, and a third fixed terminal, wherein the first movable terminal is connected to the second radio frequency circuit; the second movable terminal is connected to the third radio frequency circuit; the third movable terminal is connected to the fourth radio frequency circuit;

the first fixed terminal is connected to the first antenna; the second fixed terminal is connected to the second antenna; and the third fixed terminal is connected to a movable terminal of the double-pole double-throw switch.

18. The mobile terminal according to claim 17, wherein the second radio frequency circuit comprises:

a first low-noise amplifier; and a first filter, separately connected to the first low-noise amplifier and the first movable terminal, wherein when the first movable terminal is connected to one of the first fixed terminal and the second fixed terminal, the second radio frequency circuit receives a signal by using the connected first target antenna; or when the first movable terminal is connected to the third fixed terminal, and the movable terminal of the double-pole double-throw switch connected to the third fixed terminal is connected to one of the two fixed terminals of the double-pole double-throw switch, the second radio frequency circuit receives a signal by using the connected second target antenna.

19. The mobile terminal according to claim 17, wherein the second radio frequency circuit comprises: a second low-noise amplifier, a first power amplifier, a first transfer switch, and a second filter separately connected to the first movable terminal and the first transfer switch.

20. The mobile terminal according to claim 16, wherein the double-pole double-throw switch comprises: a fourth movable terminal, a fifth movable terminal, a fourth fixed terminal, and a fifth fixed terminal, wherein the fourth movable terminal is connected to the gating switch; the fifth movable terminal is connected to the first radio frequency circuit;

the fourth fixed terminal is connected to the third antenna; and the fifth fixed terminal is connected to the fourth antenna.

\* \* \* \* \*